Aug. 19, 1952  K. COWLEY  2,607,260
OPTICAL LEVELING INSTRUMENT

Filed April 12, 1950  4 Sheets-Sheet 1

Inventor
K. Cowley.

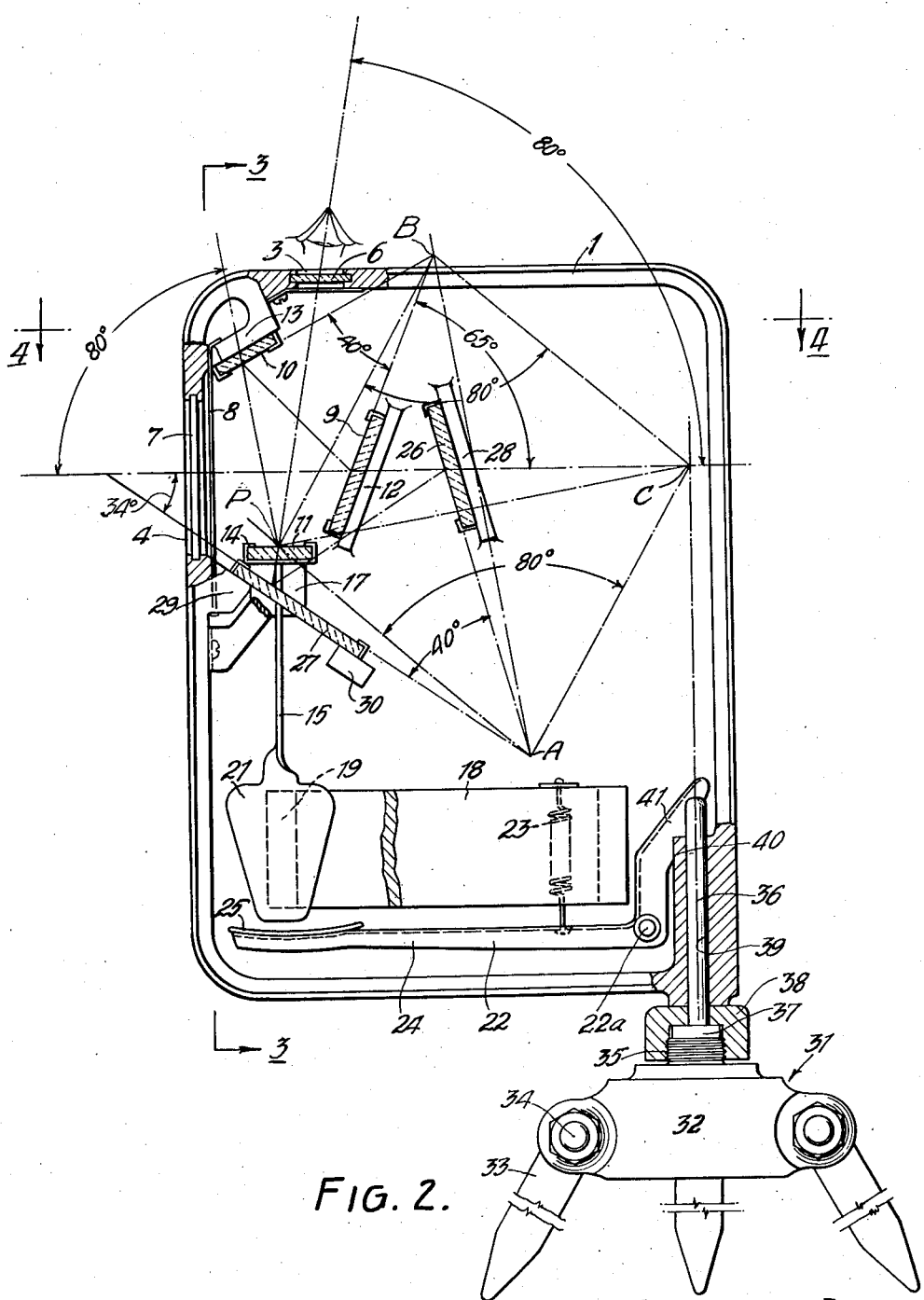

Aug. 19, 1952            K. COWLEY            2,607,260

OPTICAL LEVELING INSTRUMENT

Filed April 12, 1950            4 Sheets-Sheet 3

Inventor
K. Cowley

Patented Aug. 19, 1952

2,607,260

UNITED STATES PATENT OFFICE 2,607,260

OPTICAL LEVELING INSTRUMENT

Keith Cowley, Black Rock, Victoria, Australia

Application April 12, 1950, Serial No. 155,429
In Australia August 9, 1944

3 Claims. (Cl. 88—2.7)

The present invention relates to a levelling instrument and this application is a continuation-in-part of my prior United States application Serial No. 613,165, filed August 28, 1945 and now abandoned.

Levelling devices or optical instruments are widely used in land surveying and in building and other operations requiring measurements for determining relative levels with respect to a horizontal plane or datum level and for setting or ranging objects in or at required levels above or below a horizontal plane of reference.

Such devices or instruments as for example the Dumpey level, are reasonably accurate if used by skilled operatives, but require to be accurately adjusted for levelling of the instrument itself prior to its use at each observing station, and any variation of the level of the instrument by vibration or slippage upon uneven ground will effect an error in the subsequent sighting and measurements taken. Incidentally the instruments are costly to manufacture and purchase and require the attention of skilled operatives not always available e. g. in the building trade.

Accordingly, an object of this invention is to provide an economically constructed, effective and conveniently operable levelling instrument suitable for sighting on target points at distances of 100 feet or less in which the initial levelling of the instrument is eliminated by the provision of means to automatically compensate for variations in the attitude of the instrument, and by which the level of a selected target point may be determined relatively to a definite fixed datum point in the instrument.

Another object is to provide a levelling instrument in which a pivoted mirror automatically compensates for attitude of the instrument, thereby avoiding the necessity of levelling the instrument.

Further objects of the invention, are the provision of supporting means upon which the instrument is mountable and horizontally rotatable, and of elevating means for raising and supporting the sensitive bearing members of the pivoted mirror clear of the supports thereof when the instrument is out of use and operable by the supporting means upon mounting of the instrument thereon to engage the sensitive bearing members with the supports.

In the instrument according to this invention reflecting surfaces are so arranged that the field of vision in which the image of an object sighted is located, is divided into two sections, in one of which the image appears as normal while in the other it is inverted.

To enable normal and inverted images to be viewed at an eye-piece, the reflecting surfaces are arranged to form two reflecting systems which are disposed respectively on opposite sides of a central vertical plane, passing through the fixed datum point, the reflecting surfaces of the two systems being so related that each system presents an image of an object sighted at the eye-piece.

In operation, the instrument is sighted on the object, and the pivoted reflecting surface automatically assumes the predetermined normal position to compensate for the attitude of the instrument.

There appears to the eye of the observer, inverted and normal facsimile images of the object, and the level of, or for the latter is determined, in the instance of a sighting vane, by the conventional adjustment of the vane so as to bring the respective images of said vane as viewed at the eye-piece, into registration or alignment.

The instrument may be mounted for use upon a stand or tripod.

The invention will be better understood from the following description and the accompanying drawings of an exemplary levelling instrument.

In these drawings:

Figure 2 is a sectional side elevation of the instrument shown in Figure 1 with a supporting stand or tripod, and showing the structural relationship of the several points of the optical systems.

Figure 5:
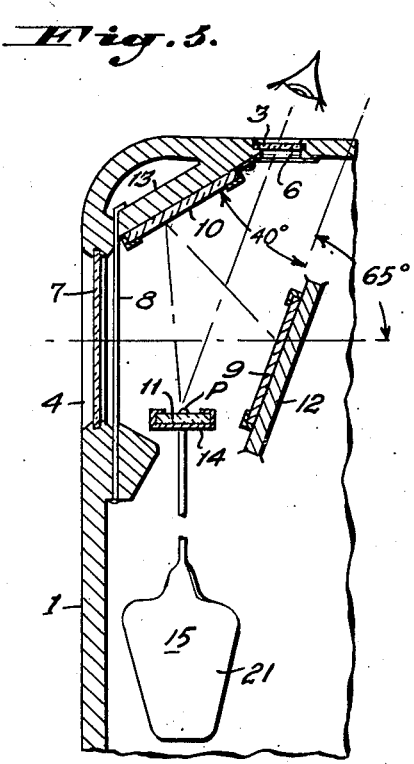
Figure 3:
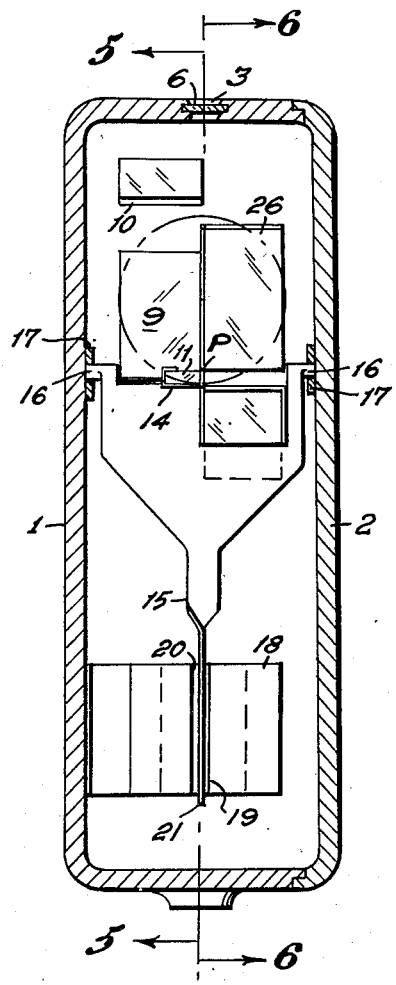
Figure 3 is a sectional elevation on the line 3—3 in Figure 2.
Figure 6:
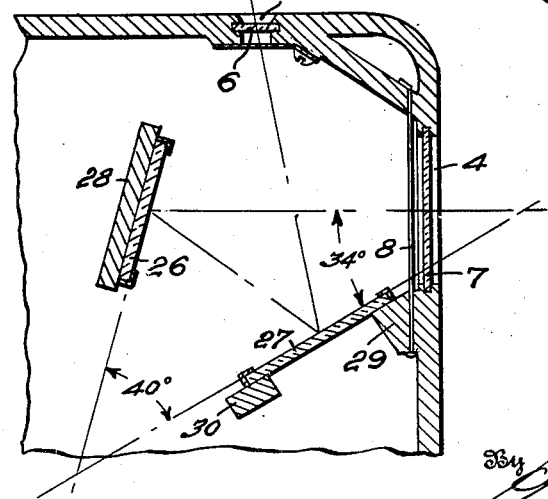

Figures 5 and 6 are part sectional elevations on the lines 5—5 and 6—6 respectively in Figure 3, showing the reflecting systems separately.

Figure 7:
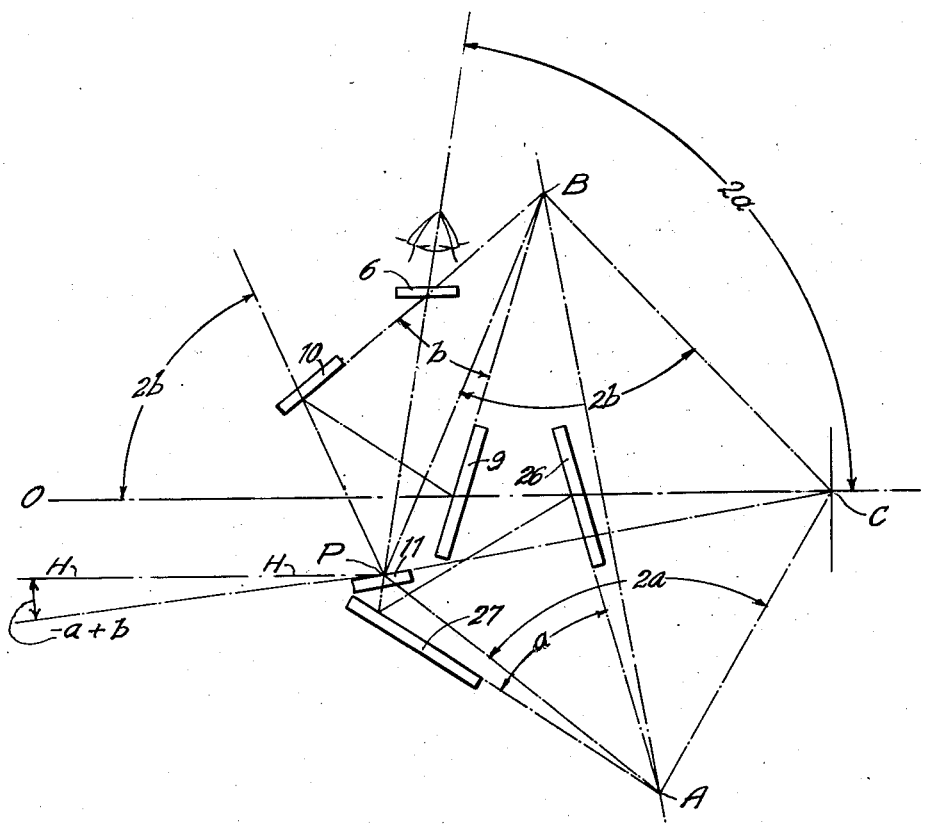

Figure 7 is a side elevation in diagram form showing the structural relationship of the parts in general terms.

In these drawings, the numeral 1 designates a casing having a detachable cover 2, an eye-piece aperture 3, a sighting or viewing aperture 4 and a handle 5 for the purposes of convenient handling and transport.

The eye-piece aperture 3 and the viewing aperture 4 are provided with an eye-piece 6 and a transparent panel 7 respectively, and positioned inwardly of the panel 7 is a fine upright strip 8. The eye-piece 6, the panel 7 and the strip 8 lie in a common or central vertical plane forming the line of demarcation or separation of two co-operative reflecting systems now to be described in detail.

In one of these systems, shown separately in Figure 5 there are three mirrors 9, 10 and 11.

The mirrors 9 and 10 are secured in fixed positions respectively to outstanding projections or lugs 12 and 13 integral with the casing 1.

The mirror 11 is mounted in a holder 14 carried by a pendulum 15 pivotally supported by trunnions 16 formed as knife edges and resting on bearing plates 17, the common axis of the opposite trunnions being in the same plane as the reflecting surface of the mirror 11 and intersecting said central vertical plane at right angles at a point indicated by P, see Figures 2, 3 and 5.

The pivoted mirror 11 is set at right angles to the pendulum 15, so that the former will always be horizontal when the latter is free to hang vertically.

Damping means are provided to arrest the oscillations of the pendulum 15 and thereby quickly bring the same to rest in a vertical position. As illustrated, the damping means comprise a permanent magnet 18, the poles 19 of which are separated by a narrow gap 20 in which the pendulum 15 swings without contact with the poles.

The weight or bob 21 of the pendulum 15 is constructed of non-magnetic metal and its swinging movements in the magnetic field set up eddy currents in the bob 21. The magnetic reaction of the induced currents opposes the movements of the bob and quickly brings the pendulum to a state of rest.

The damping means may comprise an air vane or other suitable device, the magnetic device described and illustrated being by way of example.

In order to prevent swinging of the pendulum 15 when the instrument is being carried about, a bell-crank lever 22 pivoted at 22a is maintained normally in contact with the bob 21 by a spring 23, see Figure 2. The arm 24 of the lever 22 which contacts with the bob 21 is provided with a pad 25 of soft material, such as rubber or felt.

In the other reflecting system, see particularly Figure 6, there are two mirrors 26 and 27, the mirror 26 being fixed to a lug 28 outstanding from the casing 1 and the mirror 27 being attached to lugs 29 and 30 likewise projecting from the casing 1.

The mirrors of each reflecting system are disposed at right angles to the central vertical plane of separation of the two reflecting systems in each of which the mirrors are inclinably related at requisite angles to present an image at the eyepiece 6, and said mirrors are so spaced that the lengths of the light paths in both systems, as indicated by the broken lines in Figures 5 and 6, are equal.

In the embodiment illustrated, in the above described two-mirror system, the mirrors 26 and 27 are arranged at a relative included angle of 40 degrees in planes intersecting at the point A, Figure 2, and so as to deviate incident rays anti-clockwise through a constant angle of 80 degrees, the mirror 27 being set at an angle of 34 degrees to horizontal.

The point A is equidistant from the point P and a fixed datum point C, the angle PAC being 80 degrees.

In the above described three-mirror system, the mirror 11 under influence of the pendulum 15 will always assume a horizontal position independently of the inclination of the instrument in the said central vertical plane.

The mirror 9 is disposed at an inclination of 65 degrees to the horizontal, that is to the mirror 11 in the normal position, while the mirrors 9 and 10 are relatively inclined to each other at an angle of 40 degrees, and lie in planes intersecting at the point B so as to deviate incident rays clockwise through a constant angle of 80 degrees.

The point B is equidistant from the point P and the fixed datum point C, the angle PBC being 80 degrees, see Figures 2 and 7.

The instrument may be manually supported for use by an observer or, alternatively, the instrument may be mounted for use on a stand or tripod 31 having a head 32 and foldable legs 33 pivotally connected to the head 32 by pins or bolts 34.

Projecting from the head 32 is a threaded boss 35, and positioned above the latter and in coaxial alignment therewith is a post or stem 36 having thereon a flange or collar 37.

Screwed upon the boss 35 and bearing upon the upper side of the flange 37 is a clamping nut 38 which maintains the post 36 rigidly connected with the tripod head 32.

Figure 1:
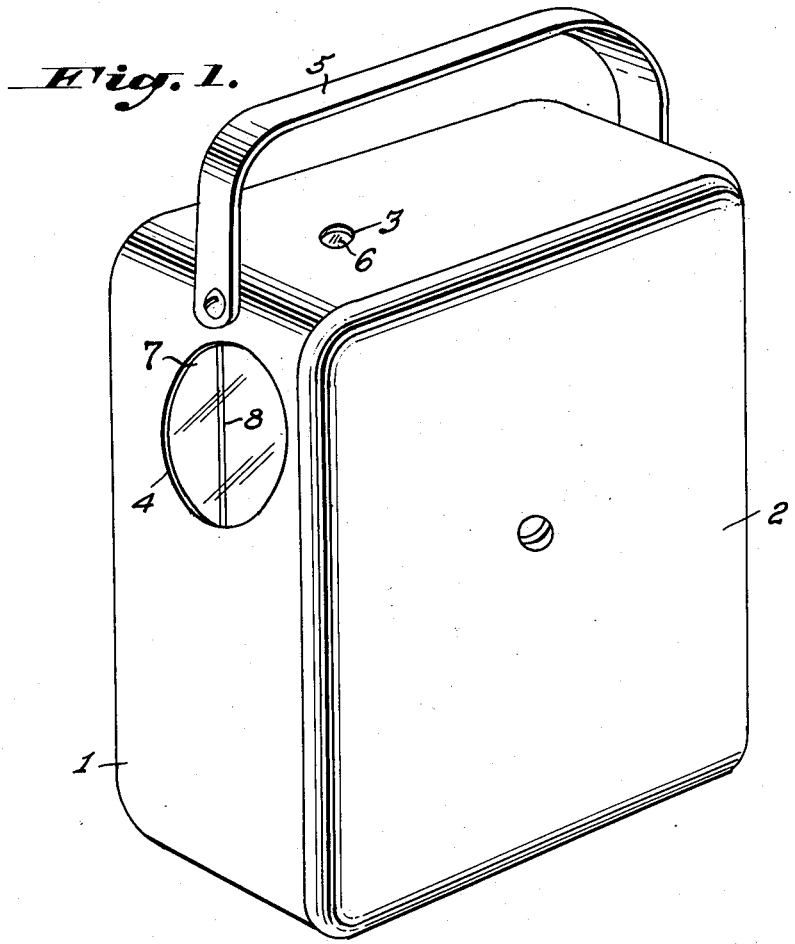
Figure 1 is a view in perspective of the levelling instrument.
Figure 4:
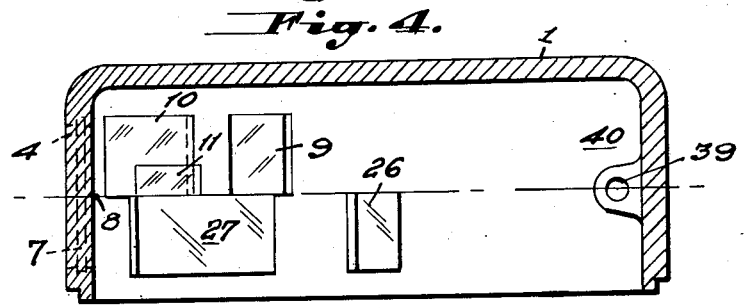
Figure 4 is a sectional plan on the line 4—4 in Figure 2, showing the two reflecting systems.

In mounting the instrument upon the tripod 31, the post 36 is entered into a hole 39 formed vertically in a boss 40 in the casing 1. The hole 39 is so positioned that its vertical axis lies in the vertical plane of separation of the two mirror systems previously described, i. e. in the central vertical plane wherein the strip or bar 8 is positioned, see Figure 4. Moreover, the fixed datum point C is located on the vertical extended axis of the hole 39, see Figure 2.

As the instrument is mounted on the tripod 31 the post 36 projects upwardly from the boss 40 and contacts with the arm 41 of the bell crank lever 22 which is thereby rotated sufficiently to release the pad 25 from the bob 21 to set free the pendulum 15.

The instrument when mounted as shown in Figure 2 upon the tripod 31 may be rotated about the post 36 so as to be turned or directed in any direction.

When the instrument is held for use in an observer's hands, the post 36 is removed from the tripod 31 and inserted into the hole 39. Pressure exerted manually upon the post 36 will effect contact of the same with the arm 41 to remove the pad 25 from the bob 21 to release the pendulum.

In use, an observer directs the instrument towards the object to be sighted and views the same through the viewing aperture 4 by way of the eye-piece 6 and the two mirror systems.

A ray of light emitted from the object and passing through the aperture 4 will undergo three reflections in the three-mirror reflecting system above described before reaching the eye-piece 6 and the eye of the observer, the course through the system being a first reflection from the mirror 9, a second reflection from the mirror 10 and a third or final reflection from the pivoted mirror 11 to the eye-piece.

A ray of light from the object will undergo two reflections in the above described two-mirror reflecting system, viz: a first reflection from the mirror 26 followed by a second reflection from the mirror 27 to the eye-piece 6.

Accordingly, the observer will see in the field of view an image of an object by reflection through the two mirror systems in two parts, one image part seen by reflection through the three mirror system being inverted, while the other image part seen after reflection through the two mirror system is erect or normal. Moreover, the erect and inverted images will appear on opposite sides of the central vertical plane separating the two reflecting systems, that is, the two images will appear on opposite sides of the image of the upright strip or bar 8 as seen at the eye-piece 6 after reflection through the mirror systems.

It will be understood that the central vertical plane divides the field of view into two sections, see Figure 3, the erect or normal image appearing in the right-hand section of this figure and the inverted image being seen in the left-hand section of the same. All reflecting surfaces are located at right angles to the central vertical plane, as is also the pivotal axis of the mirror 11.

The fixed datum point C, lies in the central vertical plane and is in the position as seen through the viewing aperture 7 of the image of the point P after reflection in reverse order by either reflecting system, that is the image of the point P after reflection by the mirrors 10 and 9 or the mirrors 27 and 26 in those orders. These four mirrors must be oriented so as to satisfy this requirement.

It can be shown that if the intersection of the planes of the mirrors 26 and 27 cuts the central vertical plane at A, Figure 7, and the intersection of the planes of the mirrors 9 and 10 cuts the central vertical plane at B, then the line AB must bisect the line PC, i. e. the line joining the pivotal point P and the fixed datum point C, at right angles.

Moreover, it can also be shown that the included angle between the mirrors 26 and 27 must be one-half the angle PAC and the included angle between the mirrors 9 and 10 must be one-half the angle PBC, see Figure 7.

It is obvious that the line of intersection of the planes of the mirrors 9 and 10 and also the line of intersection of the planes of the mirrors 26 and 27 must also cut the central vertical plane as well as the line AB at right angles.

An image of an object, such as a sighting vane, held perpendicularly to the central vertical plane will appear in the two sections of the field of view as a continuous line when the centre of the vane is at the same level as the datum point C.

A vertical movement of the vane from the true horizontal position will separate the image into two sections which will move in opposite directions from the said continuous line position. Accordingly, in ascertaining the level of an object at a point or station, the sighting vane is raised or lowered on its supporting staff until the two sections of its image as viewed at the eye-piece appear as a continuous straight line.

After thus ascertaining the level at one station or point, the instrument may be turned about the post 36 to view the sighting vane when the same is held at other stations or points at which the level is required or at which objects are to be set at the same level as an object at the first point or station.

In the exemplary instrument described herein the included angles of both pairs of mirrors are the same, viz: 40° but deviate the incident rays in opposite directions and the gravitationally controlled mirror is therefore stabilized in the horizontal plane.

It may readily be shown by geometrical construction that, in general, if, when viewed from one side a pair of mirrors deviating the incident ray clockwise in the vertical plane is regarded as having a positive included angle, and a pair of mirrors deviating the incident ray anti-clockwise is regarded as having a negative included angle, and if further the deviation of the gravitationally controlled mirror from the horizontal is regarded as positive if clockwise and negative if anti-clockwise, then the gravitationally controlled mirror must be stabilized at an angle to the horizontal equal to the algebraic sum of the included angles of these two pairs of mirrors respectively. See Figure 7 in which the line H—H is horizontal and the line A—B bisects the line P. C. at right angles.

I claim:

1. A levelling instrument for detecting the deviation from the horizontal of a line joining a target point to a fixed datum point in the instrument comprising a gravitationally controlled mirror pivotally supported upon and in parallel relation with an axis at right angles to a vertical plane passing through the target point and the fixed datum point, a pair of mirrors disposed in fixed angular relation having the planes of reflection intersecting in a line at right angles to the vertical plane, the stabilizer mirror and the angularly related mirrors comprising a reflecting system at one side of the vertical plane, and a second pair of mirrors comprising another reflecting system disposed on the other side of the vertical plane and having the planes of reflection intersecting in a line at right angles to the vertical plane, said fixed datum point being the image point of the pivot of said controlled mirror as viewed from the front of the instrument by reflection in the angularly related mirrors of the first mentioned reflecting system, and the controlled mirror pivot axis lying in the plane of said controlled mirror and passing through the point of coincidence of rays reaching said instrument horizontally and thence reflected by said respective pairs of mirrors, said lines of intersection of the reflecting planes of each pair of mirrors cutting at right angles the perpendicular bisector in the vertical plane of a line joining the axis of the stabilized mirror with the datum point, and on opposite sides of said last named line, the included angle between each pair of angularly related mirrors being equal respectively to half the angle subtended by the line joining the axis of the stabilized mirror to the datum point at the line of intersection of the planes of reflection of the respective pair of mirrors with the vertical plane, and means defining a viewing aperture for observation of rays reflected by said reflecting systems, said pairs of mirrors being so related to one another that rays leaving the final mirror of each system can be viewed through said aperture when said instrument is approximately levelled.

2. A levelling instrument in accordance with claim 1, in which the included angles between the respective mirrors of said pairs of mirrors are equal, and said gravitationally controlled mirror is stabilized with its reflecting surface in a horizontal plane when the instrument is levelled.

3. A levelling instrument in accordance with claim 1, in which the included angles between the respective mirrors of said pairs of mirrors are unequal, and in which said gravitationally controlled mirror is stabilized with its reflecting surface at an angle to the horizontal plane equal to the difference between the included angles of said pairs of mirrors, when said instrument is levelled.

KEITH COWLEY.

(References on following page)

REFERENCES CITED

The following references are of record in the file of this patent:

UNITED STATES PATENTS

| Number | Name | Date |
|---|---|---|
| 1,041,575 | Becker | Oct. 15, 1912 |
| 2,136,995 | Rinkel | Nov. 15, 1938 |
| 2,316,466 | Storer | Apr. 13, 1943 |
| 2,334,338 | Leister et al. | Nov. 16, 1943 |
| 2,386,621 | Luboshez | Oct. 9, 1945 |

FOREIGN PATENTS

| Number | Country | Date |
|---|---|---|
| 599,955 | Great Britain | Mar. 24, 1948 |